US012285959B2

(12) United States Patent
Amegashie

(10) Patent No.: US 12,285,959 B2
(45) Date of Patent: Apr. 29, 2025

(54) ULTRA-THIN PORTABLE PRINTER

(71) Applicant: David Amegashie, Albany, NY (US)

(72) Inventor: David Amegashie, Albany, NY (US)

( * ) Notice: Subject to any disclaimer, the term of this patent is extended or adjusted under 35 U.S.C. 154(b) by 209 days.

(21) Appl. No.: 18/296,134

(22) Filed: Apr. 5, 2023

(65) Prior Publication Data

US 2023/0321996 A1 Oct. 12, 2023

Related U.S. Application Data

(60) Provisional application No. 63/362,552, filed on Apr. 6, 2022.

(51) Int. Cl.
*B41J 3/36* (2006.01)
*B41J 29/02* (2006.01)
*B41J 29/13* (2006.01)

(52) U.S. Cl.
CPC ............... *B41J 3/36* (2013.01); *B41J 29/023* (2013.01); *B41J 29/13* (2013.01)

(58) Field of Classification Search
CPC ... B41J 3/36; B41J 29/02; B41J 29/023; B41J 29/12; B41J 29/13
See application file for complete search history.

(56) References Cited

U.S. PATENT DOCUMENTS

| | | | |
|---|---|---|---|
| 7,411,608 | B1 | 8/2008 | Moskaluk et al. |
| D594,861 | S | 6/2009 | Babalola |
| 9,575,703 | B2 | 2/2017 | Baranowski et al. |

(Continued)

FOREIGN PATENT DOCUMENTS

| | | |
|---|---|---|
| CN | 106965567 A | 7/2017 |
| CN | 107089059 A | 8/2017 |

(Continued)

OTHER PUBLICATIONS

TechGuru, "Review of the Polaroid Mint Pocket Printer", NerdTechy, Jan. 7, 2019. Retrieved on Apr. 23, 2023 from Internet URL <https://nerdtechy.com/polaroid-mint-review>, 19 pgs.

(Continued)

*Primary Examiner* — Justin Seo
*Assistant Examiner* — Kendrick X Liu
(74) *Attorney, Agent, or Firm* — Heslin Rothenberg Farley & Mesiti P.C.

(57) ABSTRACT

A printer includes a base and a cover. The base includes front and rear walls, and first and second sidewalls. The cover is pivotally connected to the base. A receiving section extends within the base from the first sidewall to an interior end of the section. The receiving section receives sheets of paper. A paper feeding mechanism is disposed between the interior end and the second sidewall. The paper feeding mechanism is operable to feed paper from the receiving section in the longitudinal direction through the base. A print module is disposed within the base between the paper feeding mechanism and the second sidewall. The print module includes ink injectors operable to print on paper being fed past the injectors from the receiving section. A toner module is operable to provide ink to the injectors. A battery module is disposed between the receiving section and the rear wall.

28 Claims, 11 Drawing Sheets

(56) References Cited

U.S. PATENT DOCUMENTS

| | | | | |
|---|---|---|---|---|
| 2002/0140993 | A1* | 10/2002 | Silverbrook | B41J 3/407 358/473 |
| 2011/0043579 | A1* | 2/2011 | Leppanen | B41J 3/36 347/104 |
| 2013/0335498 | A1 | 12/2013 | Janz et al. | |
| 2014/0092545 | A1* | 4/2014 | Al-Khayyat | G06F 1/1696 361/679.26 |
| 2020/0307255 | A1 | 10/2020 | Takai et al. | |

FOREIGN PATENT DOCUMENTS

| | | | |
|---|---|---|---|
| CN | 212242667 | U | 12/2020 |
| DE | 102010044627 | A1 | 3/2012 |
| JP | 2003320738 | A | 11/2003 |
| JP | 2005102372 | A | 4/2005 |
| JP | 2005255389 | A | 9/2005 |
| JP | 2007144720 | A | 6/2007 |
| JP | 4003727 | B2 | 11/2007 |
| JP | 5445502 | B2 | 3/2014 |
| JP | 2019115202 | A | 7/2019 |
| KR | 200143757 | | 6/1999 |
| KR | 20000032124 | | 6/2000 |
| KR | 20020004269 | | 1/2002 |
| KR | 20040051379 | A | 6/2004 |
| WO | 2018227595 | A1 | 12/2018 |

OTHER PUBLICATIONS

Amazon, "Photo Printer, 300dpi HD Pocket Printer, Wireless Bluetooth Portable Thermal Printer for Label Sticker Photos Printing, Cute Phone Printer for iPhone Android-Pink", Retrieved on Apr. 23, 2023 from Internet URL <https://www.amazon.in/Wireless-Bluetooth-Portable-Printing-Android-Pink/dp/B08LMJY96K>, 6 pgs.

* cited by examiner

ULTRA-THIN PORTABLE PRINTER

CROSS REFERENCE TO RELATED APPLICATIONS

This application is a non-provisional of, and claims the benefit of the filing date of, U.S. provisional application 63/362,552, filed Apr. 6, 2022, entitled, "ULTRA-THIN PORTABLE PRINTER," the contents of which are incorporated herein by reference in their entirety.

TECHNICAL FIELD

The present disclosure relates to printer devices. More specifically, the disclosure relates to portable printers.

BACKGROUND

While portable computers have evolved significantly since they were introduced into the market, portable printers have not. Portable computers can complete essentially any task that a stationary computer can accomplish. However, portable computers lack the ability to print. Often a user that is traveling away from the office, or working remotely, must search for a remotely located facility, which contains stationary printers in order to print documents.

Moreover, portable printers often sacrifice all paper storage capability in order to achieve portability. Additionally, many portable printers sacrifice the capability and/or flexibility of printing on a both US standard sized paper (i.e., 8.5 by 11 inches) and A4 sized paper (i.e., about 11.7 inches by about 8.3 inches).

Further, portable computers generally have a footprint of within about 10 inches wide by about 15 inches long. The portable computer generally may have an overall thickness (or depth) of about 1½ inches or less. A portable computer fits neatly into standardized carrying cases (such as a briefcase) that are designed to carry such portable computers. However, portable printers often do not have a footprint that can neatly fit into the same carrying case designed for a portable computer and, therefore, require an extra carrying case to transport when a user in traveling. Usually, this is due to the fact that portable printers are too thick to fit next to a portable computer in the same carrying case. More specifically, current portable printers are greater than 2 inches thick.

Accordingly, there is a need for a portable printer that can store a reasonable amount of paper. There is also a need for the portable printer to be capable of printing on A4 or standard 8.5×11 inch paper. Additionally, there is a need for a portable printer that is sized within the footprint of a laptop computer and is thin enough to fit next to a laptop computer within in a carrying case designed for the laptop computer.

BRIEF DESCRIPTION

The present disclosure offers advantages and alternatives over the prior art by providing an ultra-thin printer that has a footprint that can be similar to that of a laptop computer. The printer has a thin overall thickness such that it fits neatly next to a laptop computer in a standardized carrying case that can be designed for carrying the laptop computer, wherein no additional carrying case can be required for the printer. Additionally, the printer can carry a plurality (for example, 15-20) of sheets of A4 sized paper and/or U.S. letter sized paper.

A printer in accordance with one or more aspects of the present disclosure includes a base and a cover. The base includes front and rear walls, and laterally extending first and second sidewalls. The cover can be pivotally connected to the base. A receiving section (which may include, for example, a paper receiving tray) extends within the base from the first sidewall to an interior end of the section. The receiving section can be sized to receive a plurality sheets of paper (for example, 15-20). A paper feeding mechanism (such as rollers) can be disposed between the interior end of the receiving section and the second sidewall. The paper feeding mechanism can be operable to feed paper disposed within the receiving section in the longitudinal direction through the base. A print module can be disposed within the base between the paper feeding mechanism and the second sidewall. The print module includes ink injectors that are operable to print on paper being fed past the injectors from the receiving section. The print module also includes a toner module that can be operable to provide ink to the injectors. A battery module can be disposed between the receiving section and the rear wall. The unique positioning of the receiving section, paper feeding mechanism, print module and battery enable the printer to have a thin thickness or profile.

In some examples of the printer there can be included a microprocessor having software encoded therein. The microprocessor can be operable to received and process print information from a mobile device and to transmit the processed print information to the print module to enable the print module to print the information on the paper being fed from the receiving section.

In some examples of the printer, the microprocessor can be disposed in the base of the printer.

In some examples of the printer, the microprocessor can be disposed in the cover of the printer.

In some examples of the printer, there can be included a USB port for receiving transmission of the print information from a mobile device via a cable connecting the mobile device to the USB port. The USB port can be connected to the microprocessor to enable transmission of the print information from the USB port to the microprocessor.

In some examples of the printer, there can be included a receiving module (for example, a Bluetooth receiving and transmitting module) for receiving wireless transmission of the print information from the mobile device. The receiving module can be connected to the microprocessor to enable transmission of the print information from the receiving module to the microprocessor.

In some examples of the printer, the receiving module can be disposed in the base of the printer.

In some examples of the printer, the receiving module can be disposed in the cover of the printer.

In some examples of the printer the base has a lateral width of 9½ inches or less, a longitudinal length of 15 inches or less.

In some examples of the printer, the base has a depth of 1 inch or less.

In some examples of the printer, the cover has a depth of 1 inch or less.

In some examples of the printer, the overall depth of the printer with the cover closed over the base can be 1½ inches or less.

In some examples of the printer, there can be included a display screen that can be operable to display print information to a user.

In some examples of the printer, the display screen can be disposed in the base of the printer.

In some examples of the printer, the display screen can be disposed in the cover of the printer.

In some examples of the printer, there can be included a control panel for controlling various print functions of the printer.

In some examples of the printer, the base has an upper section and a lower section, wherein the upper section can be detachable from the lower section to enable a user to gain access to the components disposed within the interior of the base of the printer.

In some examples of the printer, there is no vertical overlap between the positions of the receiving section, the print module and the battery within the interior of the base.

In some examples of the printer, a paper exit opening is disposed in one of a bottom wall of the base or a top wall of the base, wherein the paper feeding mechanism is operable to feed paper disposed within the receiving section past the ink injectors and through the paper exit opening.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms “significantly”, “substantially”, “approximately”, “about”, “relatively,” or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
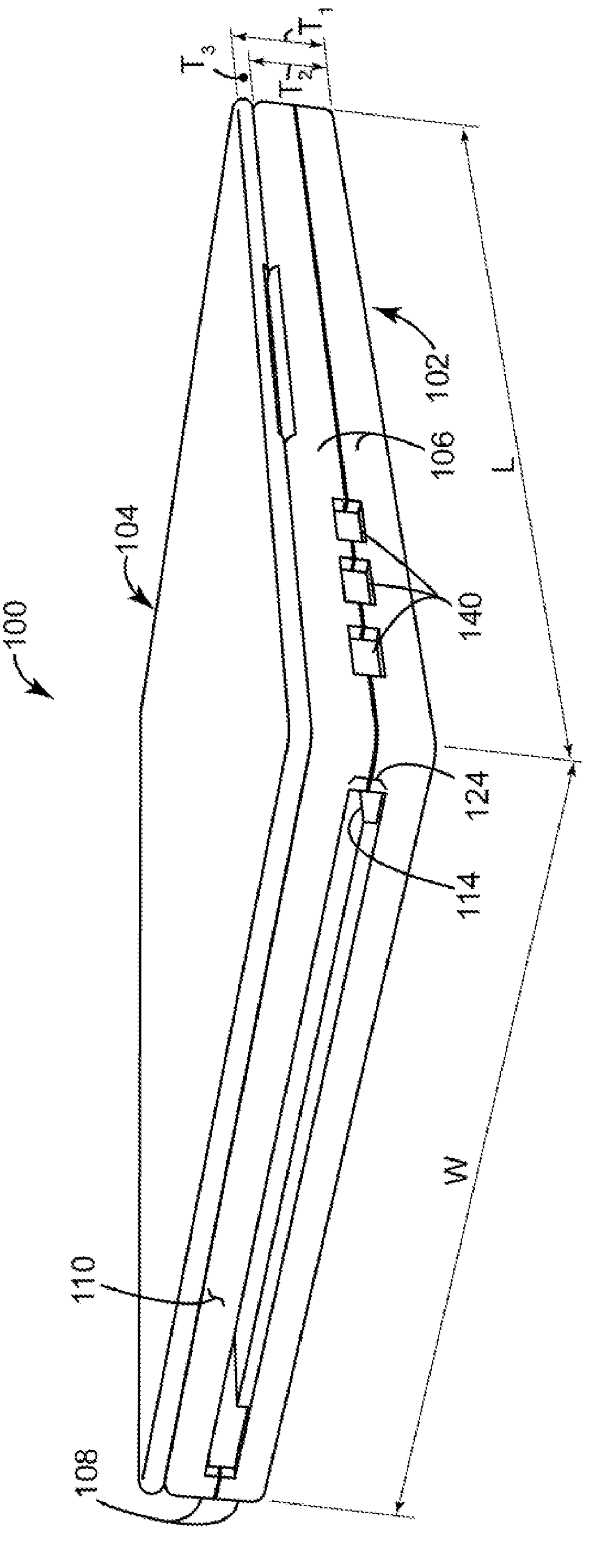
FIG. 1 depicts an example of a left, perspective view of a printer having a cover and a base, wherein the cover is closed, according to aspects described herein.

Referring to FIG. 1, an example is depicted of a left, perspective view of a printer 100 having a base 102 and a cover 104, wherein the cover 104 can be closed, according to aspects described herein. The printer 100 can be designed to be ultra-thin and to have a footprint that can be similar to that of a laptop computer (not shown). The printer 100 has a thin overall thickness $T_1$ (see also FIG. 7) such that it fits neatly next to a laptop computer in a standardized carrying case (not shown) that can be designed for carrying the laptop computer, wherein no additional carrying case can be required for the printer 100. Additionally, the printer 100 can carry a plurality (for example, 15-20) of sheets of A4 sized paper and/or U.S. letter sized paper.

The cover 104 of the printer 100 can be pivotally connected to the base 102 of the printer 100. The base 102 includes a longitudinally extending front wall 106, a longitudinally extending rear wall 108 (see also FIGS. 4 and 5), a laterally extending first sidewall 110 and a laterally extending opposing second sidewall 112 (see FIG. 3).

The base 102 may have a lateral width W of about 9½ inches or less and a longitudinal length L of about 15 inches or less. Therefore, the base 102 will have a footprint that can be similar to that of a laptop computer and be able to fit into a carrying case designed for such a laptop computer.

By way of example, the base 102 may have a thickness (or depth) $T_2$ (see also FIG. 7) of about 1.5 inches or less, 1 inch or less, or about ¾ inch or less. Additionally, by way of example, the cover 104 may have a thickness (or depth) $T_3$ (see also FIG. 7) of about ½ inch or less, or about less, ⅜ inch or less, or about ¼ inch or less, or about ⅛ inch or less. Accordingly, the overall thickness $T_1$ of the printer 100 with the cover 104 closed over the base 102 may be about 2 inches or less, about 1½ inches or less, or about 1¼ inches or less, or about 1 inch or less, or about ⅞ inches or less. Therefore, the printer 100 could advantageously fit neatly next to a standard sized laptop computer in a standard carrying case designed for just the laptop computer, without having to carry the printer 100 in a separate carrying case.

Figure 2:
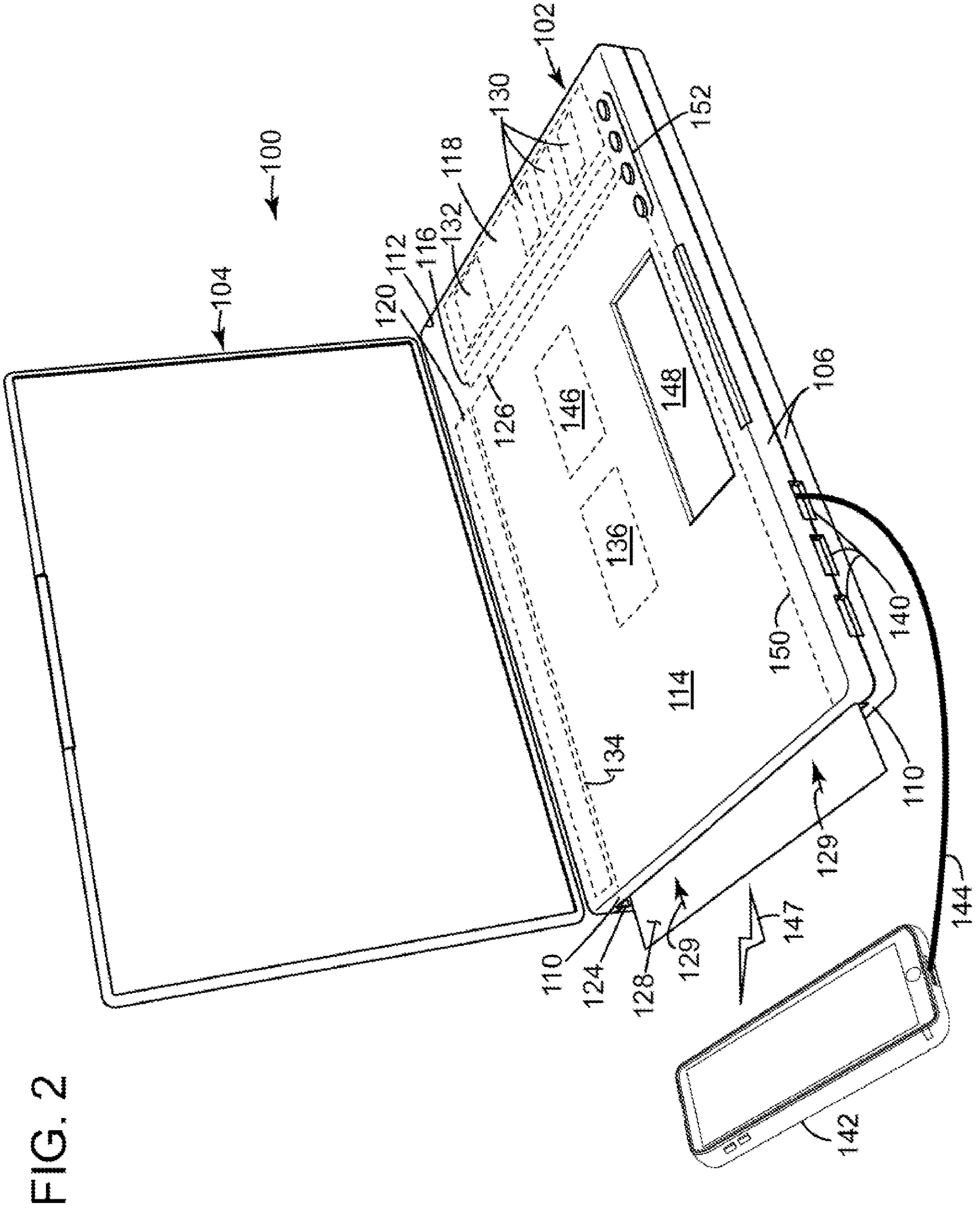
FIG. 2 depicts an example of a left, top perspective view of the printer of FIG. 1, wherein the cover of the printer is open, according to aspects described herein.

Referring to FIG. 2, an example is depicted of a left, top perspective view of the printer 100 of FIG. 1, wherein the cover 104 of the printer 100 can be open, according to aspects described herein. In order for the printer 100 to be designed thin enough to fit next to a laptop computer in the same carrying case as the laptop computer, the positioning of the various components within the base 102 or cover 104 of the printer 100 can be important.

In the example of the printer 100 depicted in FIG. 2, the printer includes such components as a receiving section 114 (which may include, for example, a paper receiving tray or other structural features operable to receive and store a plurality of sheets of paper 128), a paper feeding mechanism 116, a print module 118 and a battery 120. All of these components 114, 116, 118, 120 are large relative to other components in the printer and may be positioned within an interior 122 (see FIGS. 4 and 5) of the base 102 relative to each other so that they take up as little depth as possible. Essentially, all or some of these large components 114, 116, 118, 120 may be positioned within the interior 122 of the base 102 such that there is no vertical overlap of some or all of these components. For example, in order to make the overall thickness $T_1$ as small as possible, there may be no vertical overlap between the positions of the receiving section 114, the print module 118 and the battery 120 within the interior 122 of the base 102. There may be some vertical overlap of portions of the paper feeding mechanism 116 and the receiving section 114, because the paper feeding mechanism 116 may need certain components of the mechanism 116, such as, for example, rollers 210 (see FIG. 9)) that contact the top surface of the paper 128 in the paper receiving section 114 in order to feed the paper 128 past the print module 118.

As will be explained in greater detail herein, other smaller components (such as a microprocessor 136 and a receiver module 146) may be overlapped or layer vertically above one or more of the receiving section 114, the paper feeding mechanism 116, the print module 118 and/or the battery 120.

The receiving section 114 extends longitudinally within the base 102 from an open end 124 of the receiving section 114 (which can be disposed on the first sidewall 110 of the base 102) to an interior end 126 of the receiving section 114 (which can be disposed in the interior 122 of the base 102). The receiving section 114 can be sized to receive a plurality of sheets of full sized paper 128, such as A4 sized paper (216 mm by 279 mm) or U.S. letter sized paper (8.5 inches by 11 inches). The receiving section 114 may include, for example, a paper receiving tray, a slot extending at least partially through the base 102 of the printer or other structural features which are operable to receive and store a plurality of paper sheets 128.

The receiving section 114 may be operable and deep enough to hold between 10 to 20 to 30 or more sheets of paper 128. Advantageously, the position of the receiving section 114 relative to the other large components 116, 118, 120, enables the printer to not only be thin enough (for example, 1½ inches or less) to fit into a standard laptop computer carrying case along with the laptop computer itself, the printer 100 still includes the capability of holding, storing and printing on a plurality of full sized sheets of paper 128 (such as A4 or letter sized paper). By contrast, prior art portable computers often sacrifice the capability of storing a plurality of full sized paper sheets in order to achieve a portable configuration.

The paper feeding mechanism 116 extends laterally within the interior 122 of the base 102 and can be positioned adjacent to the receiving section 114. At least a portion of the paper feeding mechanism 116 can be disposed between the interior end 126 of the receiving section 114 and the second sidewall 112 of the base 102. The paper feeding mechanism 116 can be operable to feed paper 128 disposed or stored within the receiving section 114 in the longitudinal direction through the base 102 (for example, from left to right as illustrated by directional arrows 129 in FIG. 2).

The paper feeding mechanism 116 may be any suitable mechanism for advancing the flow of paper 128 longitudinally across the base 102. For example, the feeding mechanism 116 may be a set of mechanized rollers that make frictional contact with the paper 128 as the rollers turn.

The print module 118 extends laterally within the interior 122 of the base 102 and can be positioned adjacent to the paper feeding mechanism 116. The print module 118 can be disposed between the paper feeding mechanism 116 and the second sidewall 112 of the base 102.

The print module 118 may include a set of ink injectors 130 and a toner module or cartridge 132. The ink injectors 130 are operable to print on the paper 128 being fed past the injectors 130 from the receiving section 114. The toner module 132 can be operable to provide ink to the injectors 130.

The battery module 120 may extend longitudinally within the interior 122 of the base 102 and can be positioned adjacent the rear edge 134 of the receiving section 114. The batter module 120 can be disposed between the receiving section 114 and the rear wall 108 (see FIGS. 4 and 5). The battery module 120 can be operable to power the printer 100.

The printer 100 may also include a microprocessor 136 having software encoded therein. The microprocessor 136 can be operable to receive and process print information from a mobile device 142 (such as a cell phone or laptop computer) and to transmit the processed print information to the print module 118 to enable the print module 118 to print the information on the paper 128 as the paper is being fed from the receiving section 114 and out a paper exit opening 138 (see FIG. 3) disposed in the second sidewall 112 of the base 102.

In the example illustrated in FIG. 2, the microprocessor 136 can be disposed in the base 102 of the printer 100. Specifically, the microprocessor 136 may be positioned vertically above the receiver section 114. However, as will be discussed in greater detail herein, the microprocessor 136 may also be disposed in the cover 104 of a printer (such as printer 200 in FIG. 6) to help reduce the thickness of the base 102.

The printer 100 includes one or more USB ports 140. A USB port 140 may, for example, be used for connecting to a power cable (not shown) when the battery 120 is not being used or when the battery 120 needs recharging. A USB port 140 may also, for example, be used for receiving transmission of print information from a mobile device 142 via a transmission cable 144 connecting the mobile device 142 to the USB port 140. The USB port 140 may be connected internally to the microprocessor 136 to enable transmission of the print information from the USB port 140 to the microprocessor 136. Though the mobile device 142 is illustrated as a cell phone, the mobile device may be any of several other portable devices. For example, the mobile device may be a laptop computer or a tablet.

The printer 100 may also include a receiving module 146 for receiving wireless transmission 147 of the print information from the mobile device 142. The receiving module may also be connected internally to the microprocessor 136 to enable transmission of the print information from the receiving module 146 to the microprocessor 136. The receiving module 146 may be any number of wireless receiving devices. For example, the receiving module 146 may be a Bluetooth® receiving and transmitting device.

In the example illustrated in FIG. 2, the receiving module 146 can be disposed in the base 102 of the printer 100. Specifically, the receiving module 146 may be positioned vertically above the receiver section 114. However, as will be discussed in greater detail herein, the receiver module 146 may also be disposed in the cover 104 of a printer (such as printer 200 of FIG. 6) to help reduce the thickness of the base 102.

The printer 100 may also include a display screen 148, such as, for example, a light emitting diode (LED) display screen or a liquid crystal display (LCD) screen or the like. The display screen 148 can be operable to display print information and other information to a user (not shown) of the printer 100.

In the example illustrated in FIG. 2, the display screen 148 can be disposed in the base 102 of the printer 100. Specifically, the display screen 148 may be positioned adjacent a front edge 150 of the receiver section 114. The display screen 148 may be disposed between the front edge 150 of the receiver section 114 and the rear wall 108 of the base 102. However, as will be discussed in greater detail herein, the display screen 148 may also be disposed in the cover 104 of a printer (such as printer 200 in FIG. 6) to help reduce the thickness of the base 102.

The printer 100 may also include a control panel 152 for controlling various print functions of the printer. For example, the control panel 152 may be controlling such functions as: power on and off, printing in color or black and white or gray scale, and/or other features of the printing process. The control panel 152 may be a plurality of push buttons (as illustrated in FIG. 2) or switches or the like. Additionally, the control panel 152 may be built into the display screen 148 as a series of areas built into a touch screen.

Figure 3:
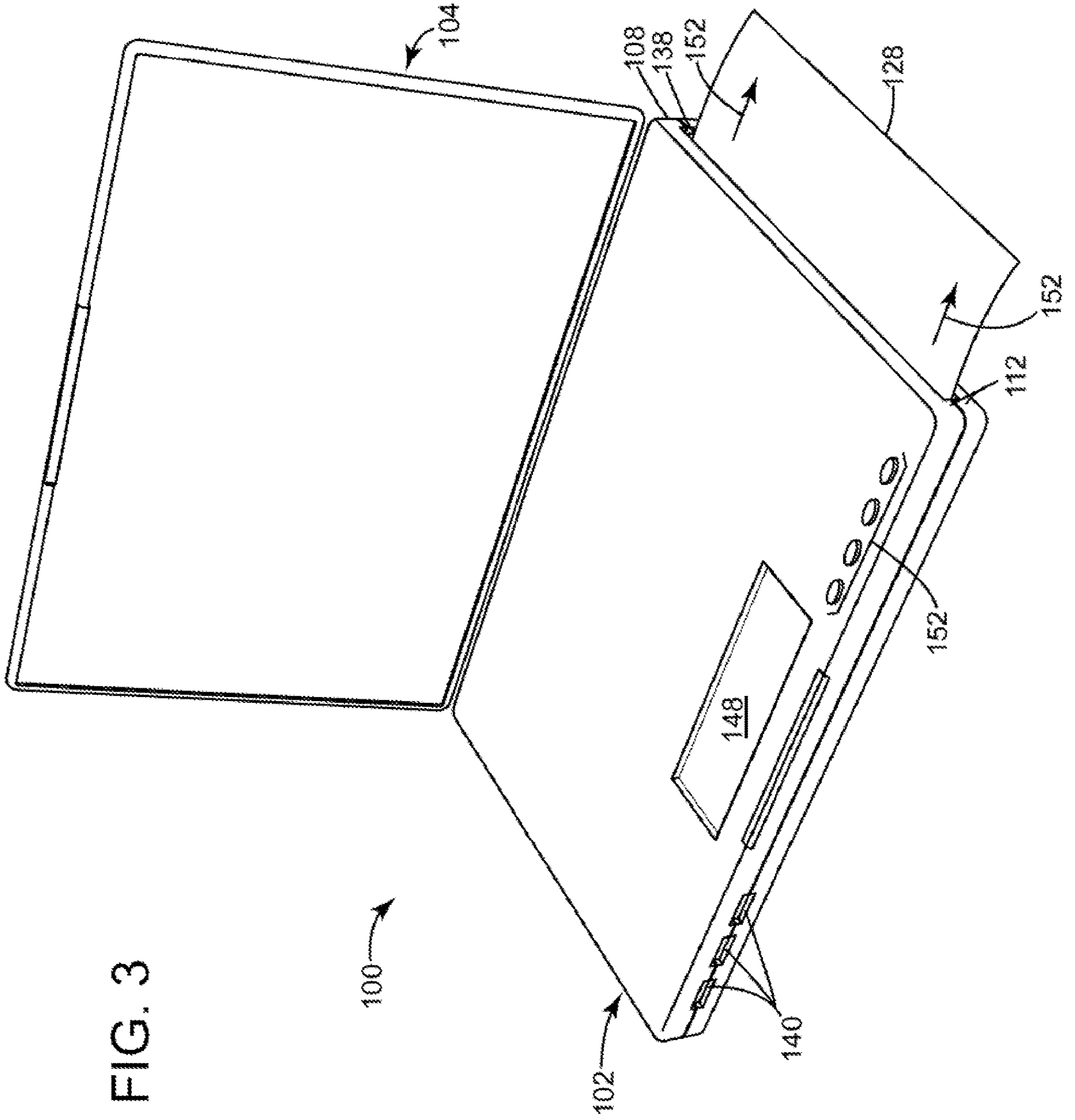
FIG. 3 depicts an example of a right, top perspective view of the printer of FIG. 1, according to aspects described herein.

Referring to FIG. 3, an example is depicted of a right, top perspective view of the printer 100 of FIG. 1, according to aspects described herein. The paper exit opening 138 can be disposed on the second sidewall 112 of the base 102 of the printer 100. Paper 128 from the receiving section 114 can be transported, or fed, longitudinally by the paper feeding mechanism 116 past the ink injectors 130 of the print module 118, wherein the injectors 130 print the print information onto the paper sheets 128. Thereafter, the paper 128 can be fed out of the paper exit opening 138 as illustrated by directional arrows 153. A retractable support (not shown) may be used to catch the paper sheets 128 as they exit the paper exit opening 138 of the printer 100.

Figure 4:
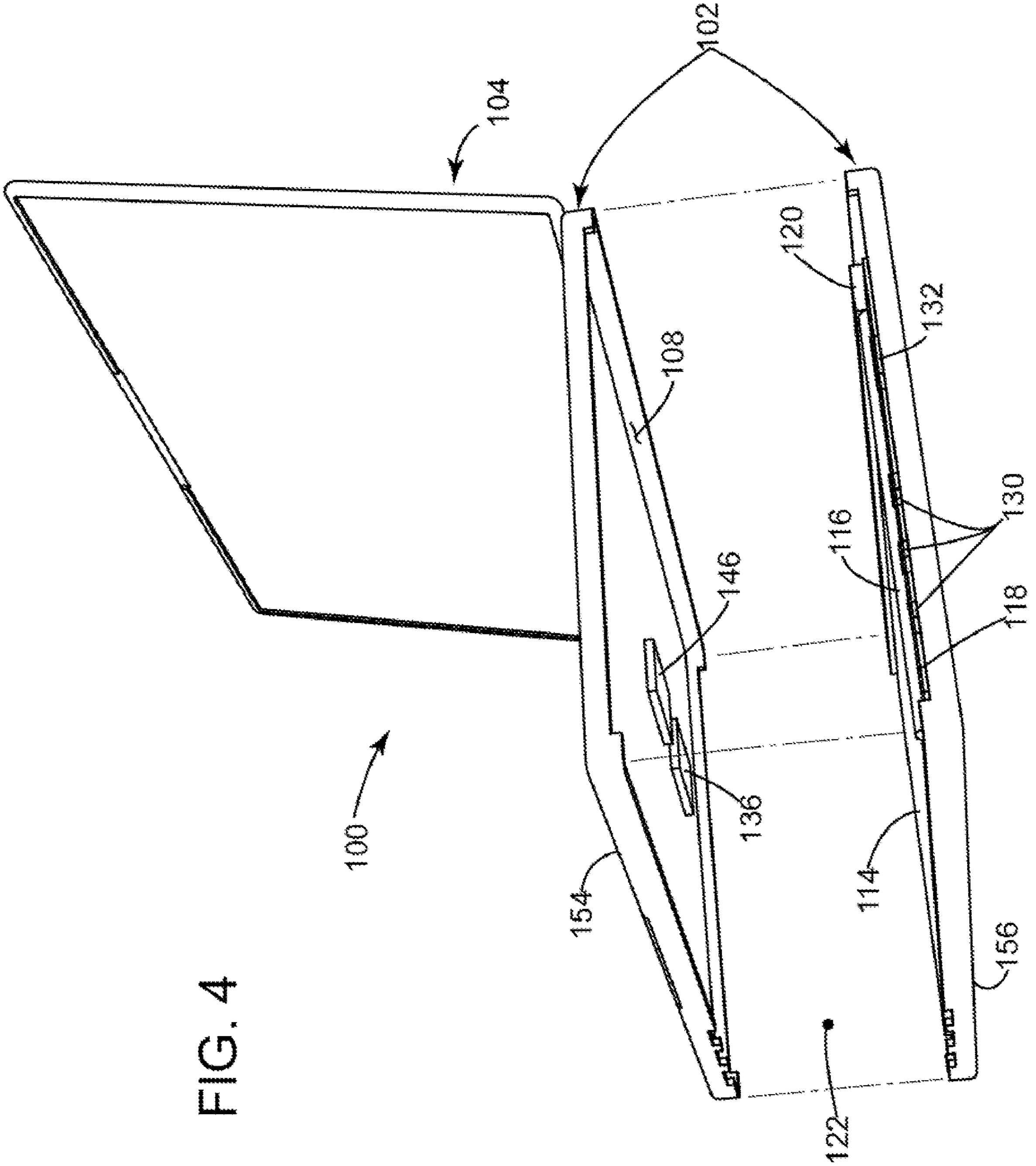
FIG. 4 depicts an example of an exploded, right, bottom perspective view of the printer of FIG. 1, wherein the base of the printer has an upper section detached from a lower section to enable a user to gain access to the components disposed within an interior of the base, according to aspects described herein.
Figure 5:
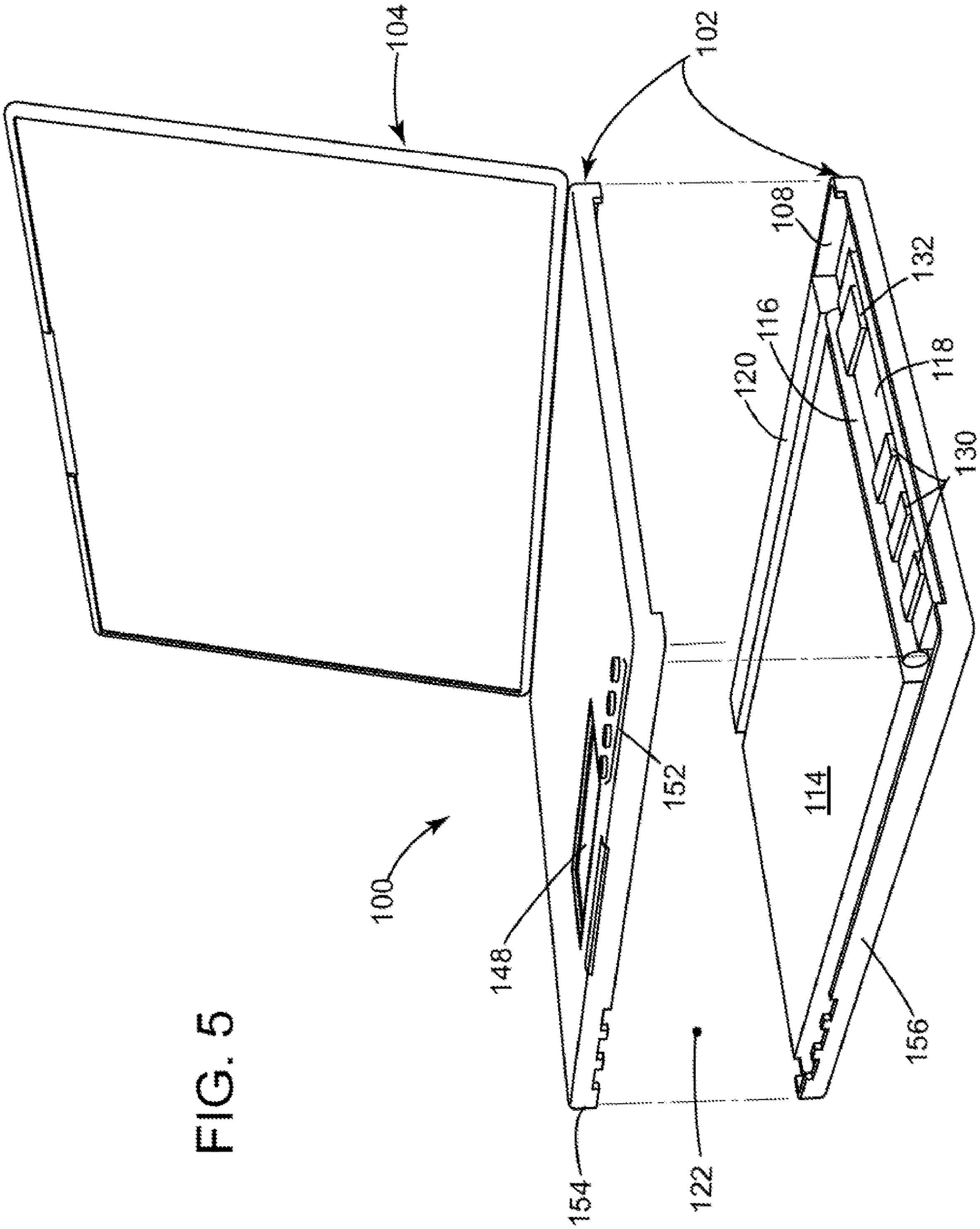
FIG. 5 depicts an example of an exploded, right, top perspective view of the printer of FIG. 1, wherein the upper section of the base detached from the lower section of the base, according to aspects described herein.

Referring to FIGS. 4 and 5, an example is depicted of an exploded, right, bottom, perspective view (FIG. 4) and an exploded, right, top, perspective view (FIG. 5) of the printer 100 of FIG. 1, wherein the base 102 of the printer 100 has an upper section 154 detached from a lower section 156 to enable a user (not shown) to gain access to the components disposed within the interior 122 of the base 102, according to aspects described herein. The upper section 154 may be detachable from the lower section 156 through a variety of features. For example, the upper section 154 may be pivotally hinged to the lower section 156. Alternatively, the upper section 154 may be removably attached to the lower section 156 via tabs or various fastening devices.

The upper section 154 may be one upper section that covers and can be removable from the entire lower section 156 to expose all components disposed within the lower section 156. Alternatively, the upper section 154 may include a plurality of upper sections that expose only portions of the interior components disposed in the lower section 156.

By being able to detach the upper section 154 from the lower section 156, various maintenance functions may be performed. For example, the toner may be replaced, or paper jams may be removed.

Figure 6:
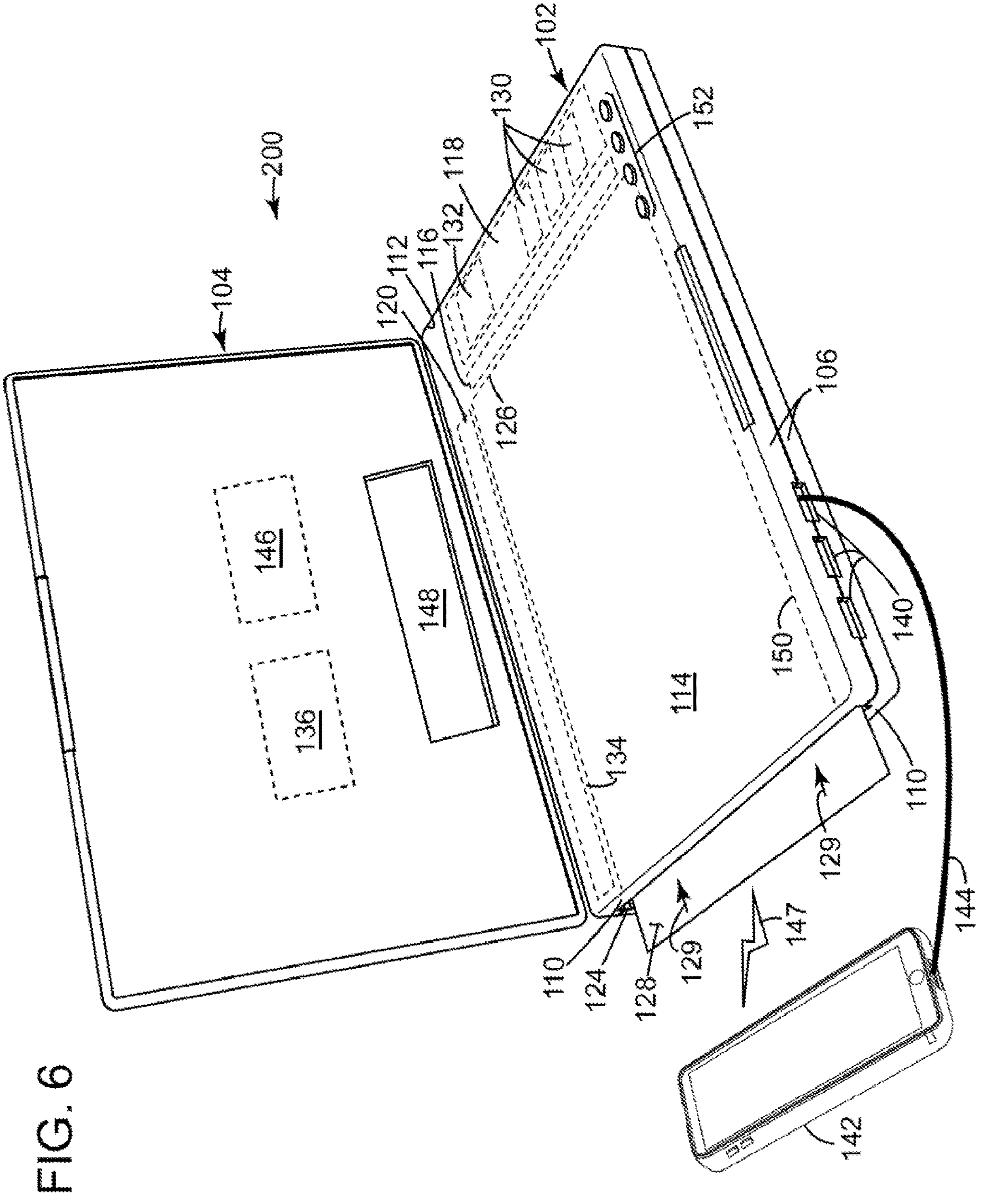
FIG. 6 depicts an example of a left, top perspective view of another printer having a cover and a base, wherein the printer incudes a microprocessor, a receiving module and a screen disposed within the cover of the printer, according to aspects described herein.
Figure 7:
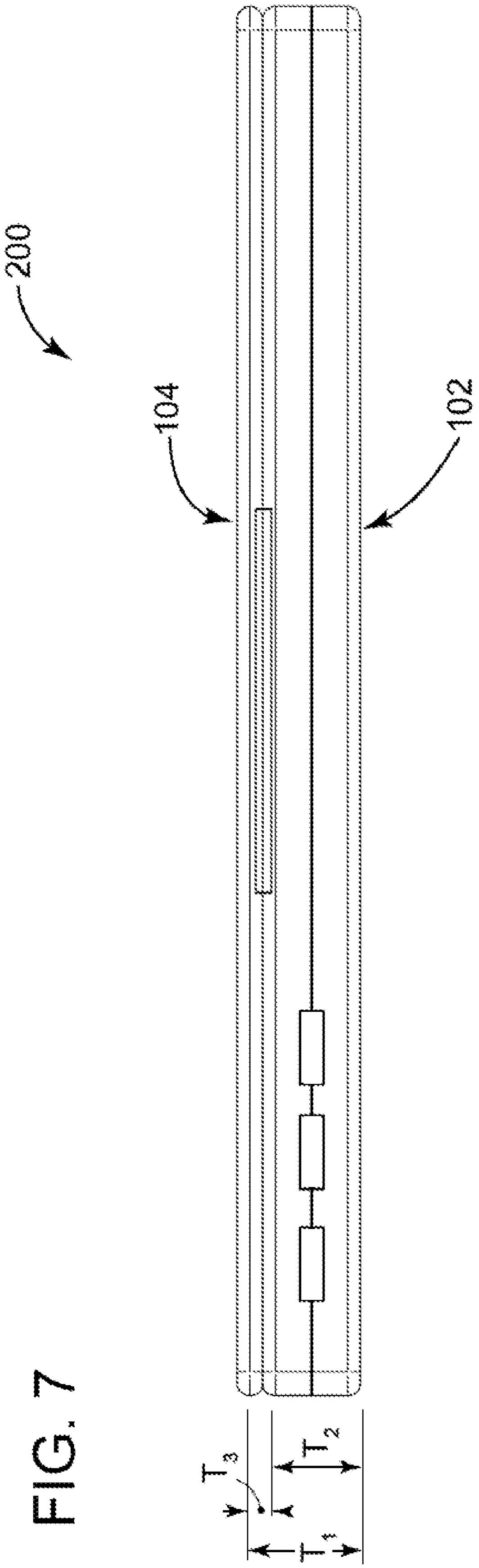
FIG. 7 depicts an example of a plan front view of the printer of FIG. 6, according to aspects described herein.

Referring to FIGS. 6 and 7, an example is depicted of a left, top perspective view of another printer 200 having its cover 102 open (FIG. 6) and a plan, front view of the printer 200 having its cover closed (FIG. 7), wherein the printer 200 incudes the microprocessor 136, the receiving module 146 and the display screen 148 disposed within the cover 104 of the printer 200, according to aspects described herein. By disposing such components as the microprocessor 136, receiving module 146 and/or display screen 148 in the cover 104, the base 102 of printer 200 may be made thinner. For example, the thickness $T_2$ of the base 102 may be designed to be 1 inch thick or less, or may be designed to be ¾ inch thick or less. Additionally, components such as the microprocessor 136, receiving module 146 and/or display screen 148 may be designed to be very thin, so they may not appreciably affect the thickness $T_3$ of the cover 104. For example, the thickness $T_3$ of the cover 104 may be designed to be ½ inch thick or less, ⅜ inch thick or less, ¼ inch thick or less, ⅛ inch thick or less. Therefore, by disposing such components as the microprocessor 136, the receiving module 146 and/or display screen 148 in the cover 104, the overall thickness $T_1$ of the printer 200 may be designed to be thinner. For example, the overall thickness $T_1$ of the printer 200 may be designed to be about 2 inches thick or less, 1 and ½ inches thick or less, 1 and ¼ inches thick or less, 1 and ⅛ inches thick or less, 1 inch thick or less, or ⅞ inch thick or less.

Figure 8:
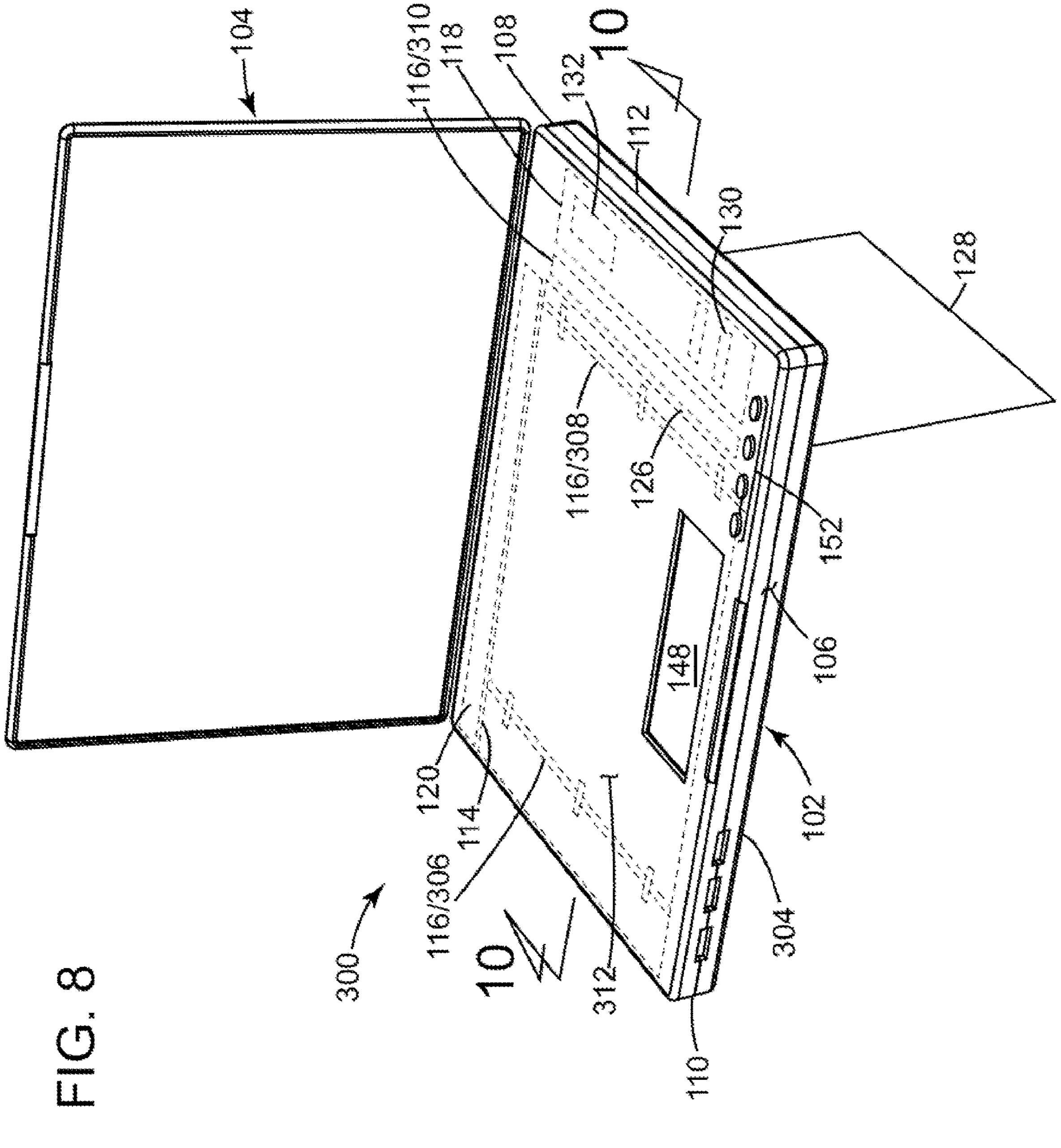
FIG. 8 depicts an example of a perspective view of another printer having its paper exit opening disposed in a bottom wall of the printer, according to aspects described herein.
Figure 9:
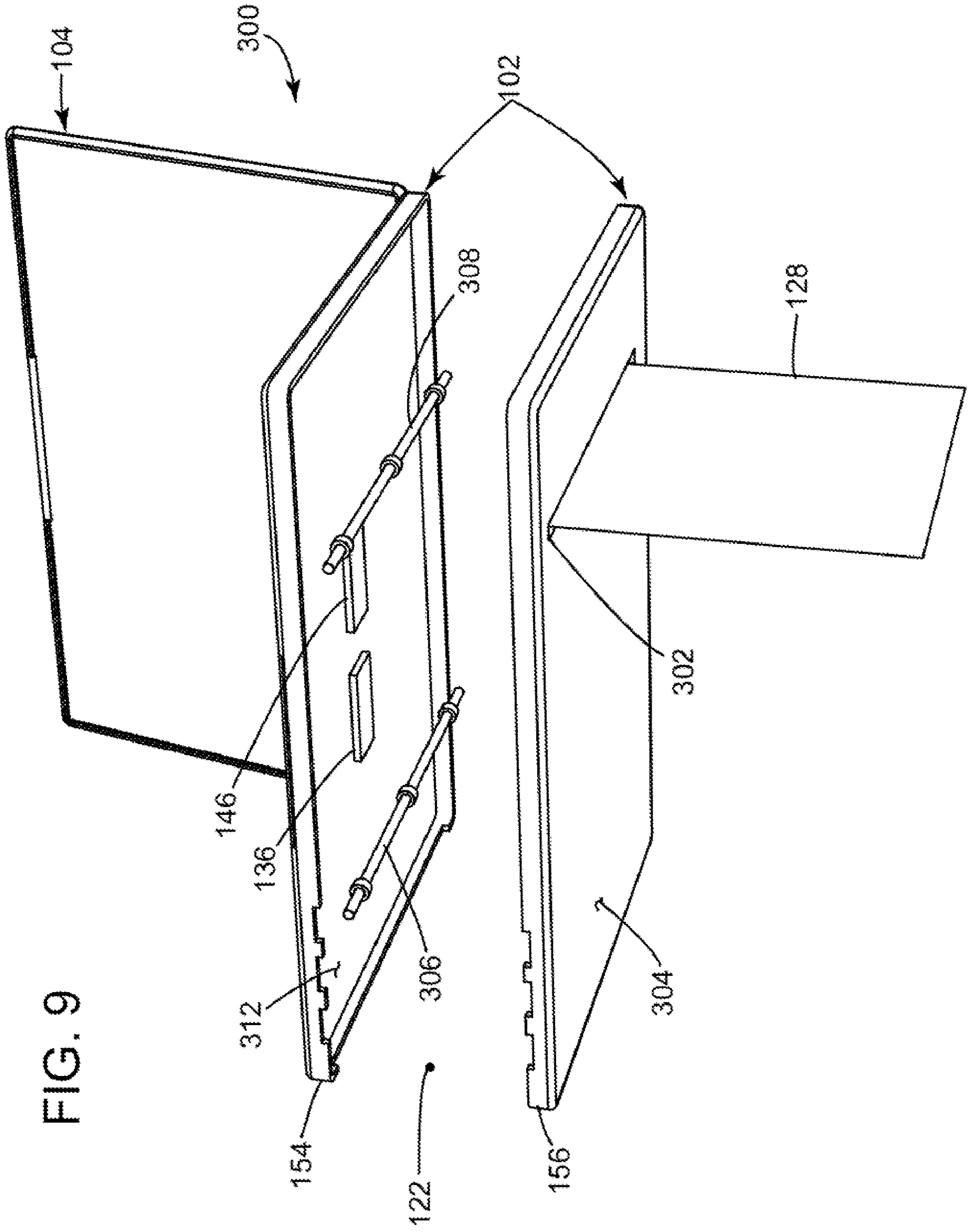
FIG. 9 depicts an example of an exploded, perspective view of the printer of FIG. 8, wherein the base of the printer has an upper section detached from a lower section, according to aspects described herein.

Referring to FIGS. 8 and 9, a perspective view (FIG. 8) and an exploded view (FIG. 9) are depicted of another printer 300 having its paper exit opening 302 disposed in a bottom wall 304 of the printer 300, according to aspects described herein. The printer 300 is similar in construction and components as that of printers 100 and 200. Accordingly, like reference numbers will be used to refer to like components in printer 300.

The printer 300 includes a base 102 comprising longitudinally extending front wall 106 and a longitudinally extending rear wall 108. The printer 300 also includes a laterally extending first sidewall 110 and a laterally extending second sidewall 112. A cover 104 can be pivotally connected to the base 102. A receiving section 114 extends within the base 102 from the first sidewall 110 to an interior end 126 of the receiving section 114. The receiving section 114 can be sized to receive a plurality of A4 or 8½ by 11 sheets of paper 128. At least a portion of a paper feeding mechanism 116 can be disposed between the interior end 126 of the receiving section 114 and the second sidewall 112. The paper feeding mechanism 116 can be operable to feed paper 128 disposed within the receiving section 114 through the base 102 and out of a paper exit opening 302. A print module 118 can be disposed within the base 102 between the paper feeding mechanism 116 and the second sidewall 112. The print module 118 can include ink injectors 130 (see also FIG. 5) that are operable to print on paper 128 being fed past the injectors 130 from the receiving section 114. The print module 118 can also include a toner module or cartridge 132 that is operable to provide ink to the injectors 130. A battery module 120 may be disposed between the receiving section 114 and the rear wall 108.

The printer base 102 also has an upper section 154 detached from a lower section 156 (see FIG. 9) to enable a user (not shown) to gain access to the components disposed within the interior 122 of the base 102. The upper section 154 may be detachable from the lower section 156 through a variety of features. For example, the upper section 154 may be pivotally hinged to the lower section 156. Alternatively, the upper section 154 may be removably attached to the lower section 156 via tabs or various fastening devices.

An important factor enabling the overall thickness $T_1$ to be thin (e.g., 2 inches or less) is that there may be no vertical overlap between the positions of the receiving section 114, the print module 118 and the battery 120 within the interior 122 of the base 102. However, in the example of printer 300, there is another important factor which further enables the overall thickness $T_1$ to be thin. That is, the paper feeding mechanism 116 may route (or feed) the paper 128 horizontally toward the print module 118, but then directs the paper downward in a vertical directions as the paper passes by the ink injectors 130 of the print module 118 and out a paper exit opening 302 that is positioned in a bottom wall 304 of the printer 300.

Advantageously, the paper feed mechanism 116 may be operable to turn the paper 128 from a horizontal direction to a vertical direction as it passes by the ink injectors 130. Accordingly, the longitudinal length of the ink injectors 130 may be oriented horizontally so that the ink injector's length does not interfere with the overall vertical thickness $T_1$ of the printer 300. The ink injectors 130 being positioned flat in the base 102 enables the injectors 130 to inject the ink in a horizontal direction as the paper 128 passes vertically past the ink injectors 130 and out the paper exit opening 302 in the bottom wall 304 of the base 102 of the printer 300.

Referring specifically to FIG. 9, it can be seen that paper feed mechanism 116 may include a first paper roller 306 and a second paper roller 308 that contact the top sheet of paper 128 in the paper receiving section 114. The rollers 306, 308 may urge the paper 128 initially in a horizontal direction. The paper feeding mechanism 116 may then direct the paper downward past the print module 118 and out the paper exit opening 302 in the bottom wall 304 of the printer 300.

Figure 10:
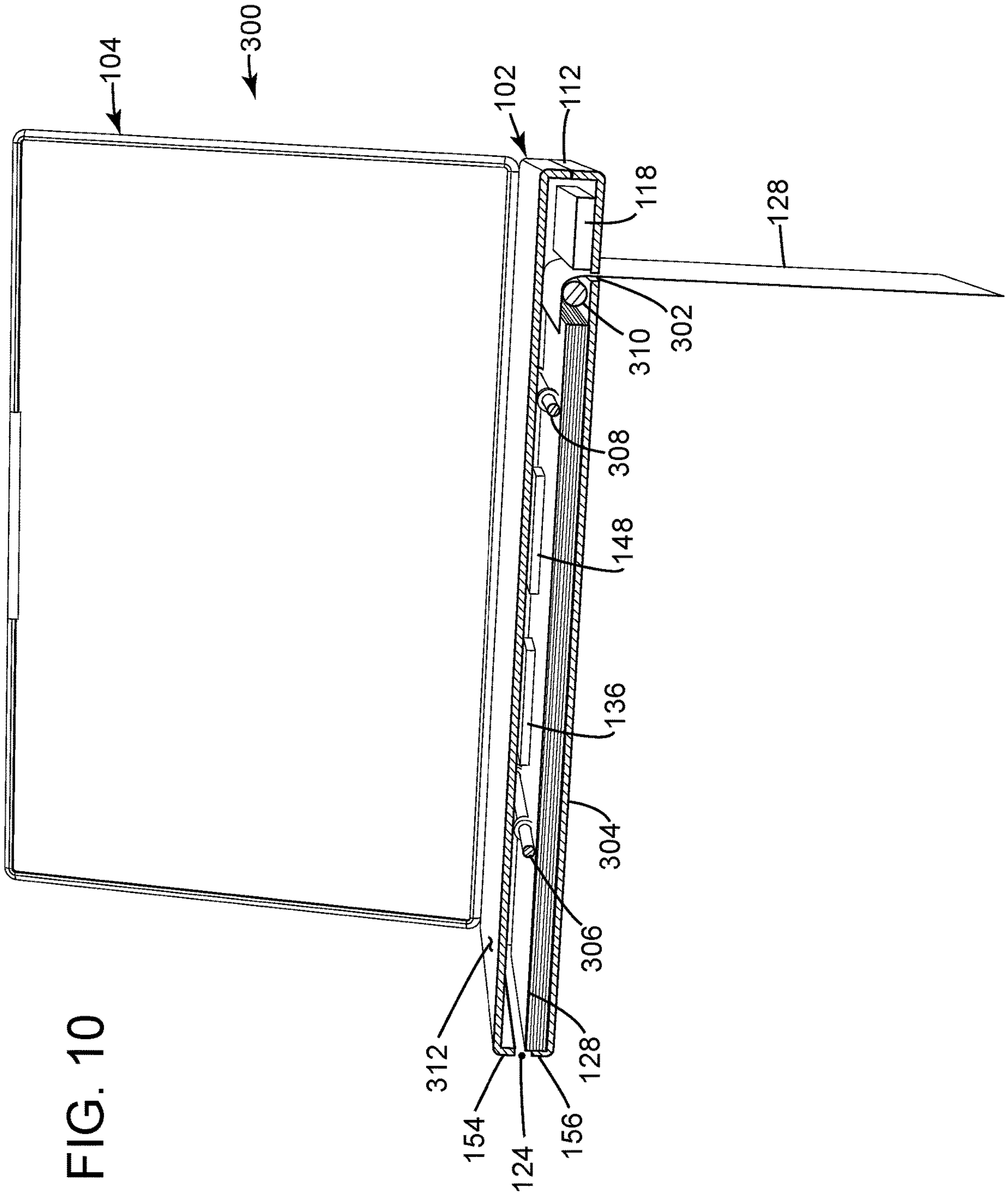
FIG. 10 depicts an example of a cross sectional view of the printer of FIG. 8 taken along the line 10-10 in FIG. 8, according to aspects described herein.

Referring to FIG. 10, an example is depicted of a cross sectional view of the printer 300 taken along the line 10-10 in FIG. 8, according to aspects described herein. As can be seen from the cross section, the printer feeding mechanism 116 may also include a third roller 310, which may help to direct the paper 128 downward between the third roller 310 and the print module 118. By directing the paper 128 vertically downward past the print module 118, the print module's longitudinal length advantageously may not interfere with the overall thickness $T_1$ of the printer 300 as the print module 118 injects ink in the horizontal direction.

Figure 11:
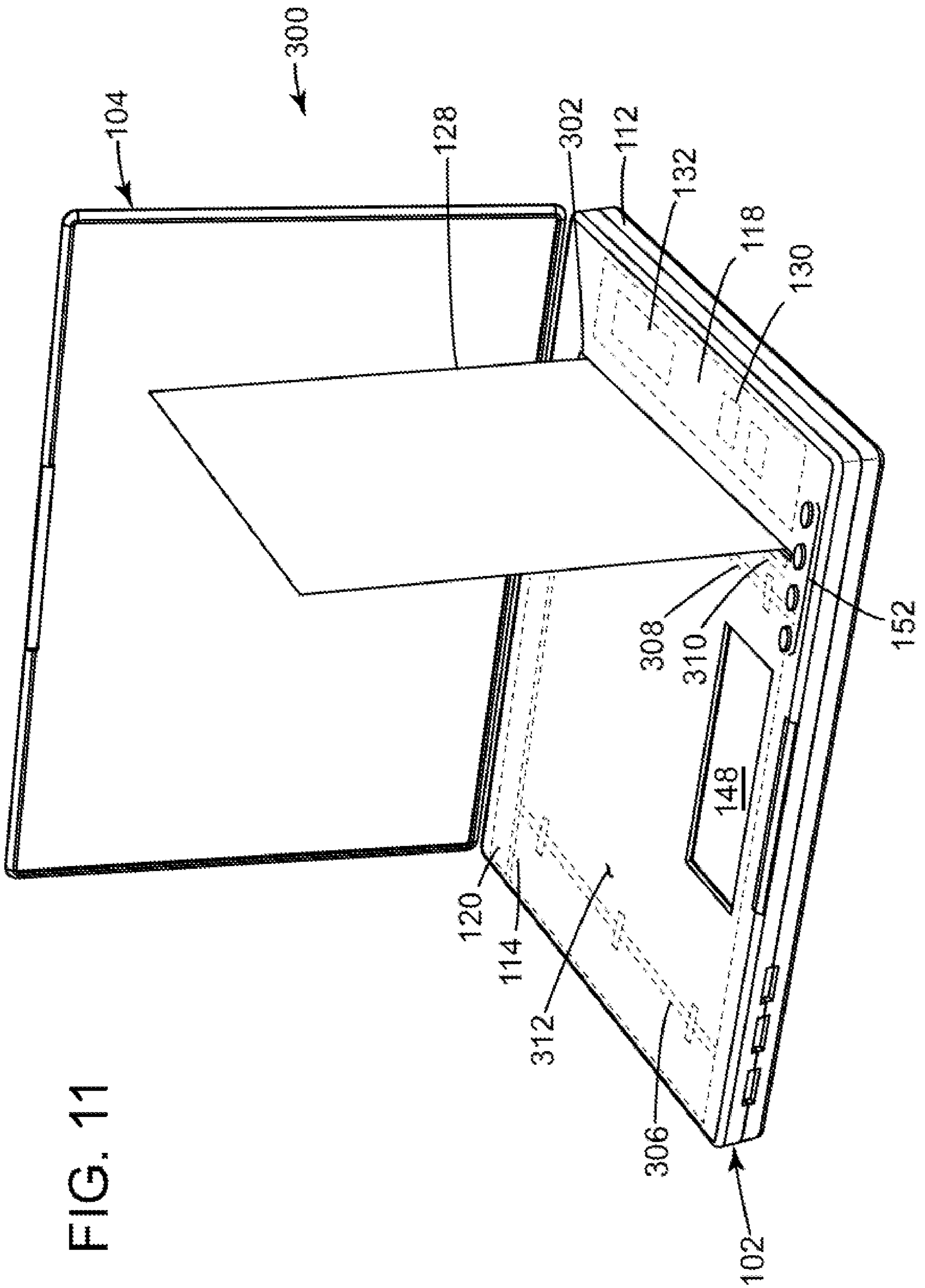
FIG. 11 depicts an example of a perspective view of the printer of FIG. 8 having its paper exit opening disposed in a top wall of the printer, according to aspects described herein.

Referring to FIG. 11, an example is depicted of a perspective view of printer 300 having its paper exit opening 302 alternatively disposed in a top wall 312 of the printer 300, according to aspects described herein. In this alternative example, the paper feeding mechanism 116 may route (or feed) the paper 128 horizontally toward the print module 118, but then direct the paper upward in a vertical directions as the paper passes by the ink injectors 130 of the print module 118 and out a paper exit opening 302 that is positioned in a top wall 312 of the printer 300.

Again, advantageously, the longitudinal length of the ink injectors 130 may be oriented horizontally so that the ink injector's length does not interfere with the overall vertical thickness $T_1$ of the printer 300. The ink injectors 130 being positioned flat in the base 102 enables the injectors 130 to inject the ink in a horizontal direction as the paper 128 passes vertically past the ink injectors 130 and out the paper exit opening 302 in the top wall 312 of the base 102 of the printer 300.

The examples illustrated in FIGS. 10 and 11 show the print module 118, with its associated ink injectors 130 and toner module 132, positioned to the right side (second sidewall 112) of the printer 300. In this orientation, ink from the ink injectors 130 may spray from left to right from the ink injectors 130 toward the paper 128, which is located to the left of the print module 118 and between the print module 118 and third paper roller 310 of the paper feeding mechanism 116. However, the print module 118 may also be positioned in other orientations within the printer 300 as well. For example, the print module 118 may be positioned adjacent the paper receiving section 114, wherein the paper feeding mechanism 116 and may feed the paper horizontally across the top or bottom of the print module 118 before directing the paper out the paper exit opening 302 in the bottom or top walls 304, 310 of the printer 300 respectively.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A printer comprising:

a base comprising front and rear walls, and laterally extending first and second sidewalls;

a cover pivotally connected to the base;

a receiving section extending within the base from the first sidewall to an interior end of the receiving section, the receiving section sized to receive a plurality of sheets of paper;

a paper feeding mechanism disposed between the interior end of the receiving section and the second sidewall, the paper feeding mechanism operable to feed paper disposed within the receiving section through the base;

a print module disposed within the base between the paper feeding mechanism and the second sidewall, the print module comprising:

ink injectors operable to print on paper being fed past the injectors from the receiving section, and a toner module operable to provide ink to the injectors; and a battery module disposed between the receiving section and the rear wall.

2. The printer of claim 1, comprising:

a microprocessor having software encoded therein, the microprocessor operable to receive and process print information from a mobile device and to transmit the processed print information to the print module to enable the print module to print the information on the paper being fed from the receiving section.

3. The printer of claim 2, wherein the microprocessor is disposed in the base of the printer.

4. The printer of claim 2, wherein the microprocessor is disposed in the cover of the printer.

5. The printer of claim 2, comprising:

a USB port for receiving transmission of the print information from the mobile device via a cable connecting the mobile device to the USB port, the USB port connected to the microprocessor to enable transmission of the print information from the USB port to the microprocessor.

6. The printer of claim 2, comprising:

a receiving module for receiving wireless transmission of the print information from the mobile device, the receiving module connected to the microprocessor to enable transmission of the print information from the receiving module to the microprocessor.

7. The printer of claim 6, wherein the receiving module is disposed in the base of the printer.

8. The printer of claim 6, wherein the receiving module is disposed in the cover of the printer.

9. The printer of claim 1, wherein the base has a lateral width of about 9 ½ inches or less, a longitudinal length of about 15 inches or less.

10. The printer of claim 9, wherein the overall depth of the printer with the cover closed over the base is about 1 ½ inches or less.

11. The printer of claim 1, wherein the base has a depth of about 1 inch or less.

12. The printer of claim 1, wherein the cover has a depth of about ½ inch or less.

13. The printer of claim 1, comprising a display screen that is operable to display print information to a user.

14. The printer of claim 13, wherein the display screen is disposed in the base of the printer.

15. The printer of claim 13, wherein the display screen is disposed in the cover of the printer.

16. The printer of claim 1, comprising a control panel for controlling various print functions of the printer.

17. The printer of claim 1, wherein the base has an upper section and a lower section, wherein the upper section is detachable from the lower section to enable a user to gain access to the components disposed within the interior of the base of the printer.

18. The printer of claim 1, wherein, there is no vertical overlap between the positions of the receiving section, the print module and the battery within the interior of the base.

19. The printer of claim 1, comprising:

a paper exit opening disposed in one of a bottom wall of the base or a top wall of the base;

wherein the paper feeding mechanism is operable to feed paper disposed within the receiving section past the ink injectors and through the paper exit opening.

20. The printer of claim 1, comprising a display screen that is operable to display print information to a user.

21. The printer of claim 1, comprising a control panel for controlling various print functions of the printer.

22. The printer of claim 1, wherein the base has an upper section and a lower section, wherein the upper section is detachable from the lower section to enable a user to gain access to the components disposed within the interior of the base of the printer.

23. The printer of claim 1, wherein, there is no vertical overlap between the positions of the receiving section, the print module and the battery within the interior of the base.

24. The printer of claim 1, comprising:

a paper exit opening disposed in one of a bottom wall of the base or a top wall of the base;

wherein the paper feeding mechanism is operable to feed paper disposed within the receiving section past the ink injectors and through the paper exit opening.

25. A printer comprising:

a base comprising front and rear walls, and laterally extending first and second sidewalls;

a receiving section extending within the base from the first sidewall to an interior end of the receiving section, the receiving section sized to receive a plurality of sheets of paper;

a paper feeding mechanism disposed between the interior end of the receiving section and the second sidewall, the paper feeding mechanism operable to feed paper disposed within the receiving section through the base;

a print module disposed within the base between the paper feeding mechanism and the second sidewall, the print module comprising:

ink injectors operable to print on paper being fed past the injectors from the receiving section, and a toner module operable to provide ink to the injectors; and a battery module disposed between the receiving section and the rear wall.

26. The printer of claim 25, comprising:

a microprocessor having software encoded therein, the microprocessor operable to receive and process print information from a mobile device and to transmit the processed print information to the print module to enable the print module to print the information on the paper being fed from the receiving section.

27. The printer of claim 25, wherein the base has a lateral width of about 9 ½ inches or less, a longitudinal length of about 15 inches or less.

28. The printer of claim 25, wherein the overall depth of the printer is about 1 ½ inches or less.

* * * * *